R. W. COFFEE.
TRANSMISSION GEAR MECHANISM.
APPLICATION FILED JAN. 12, 1909.
970,467.
Patented Sept. 20, 1910.
3 SHEETS—SHEET 1.
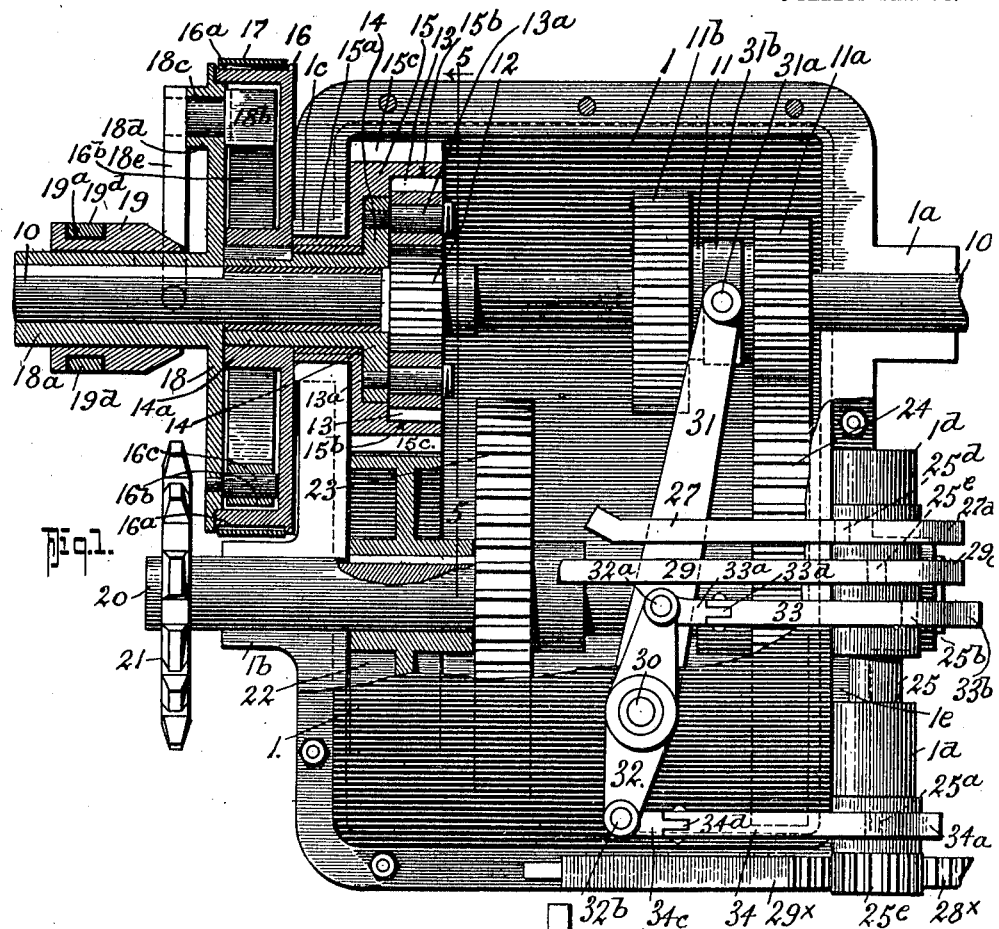
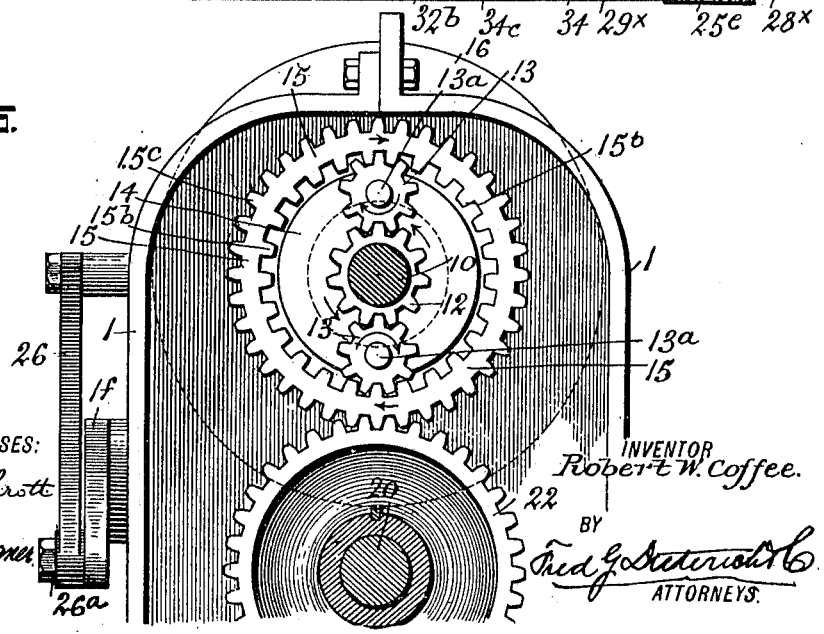
WITNESSES:
John T. Schrott
Charles H. Wagner
INVENTOR
Robert W. Coffee.
BY
Fred G. Dieterich
ATTORNEYS.

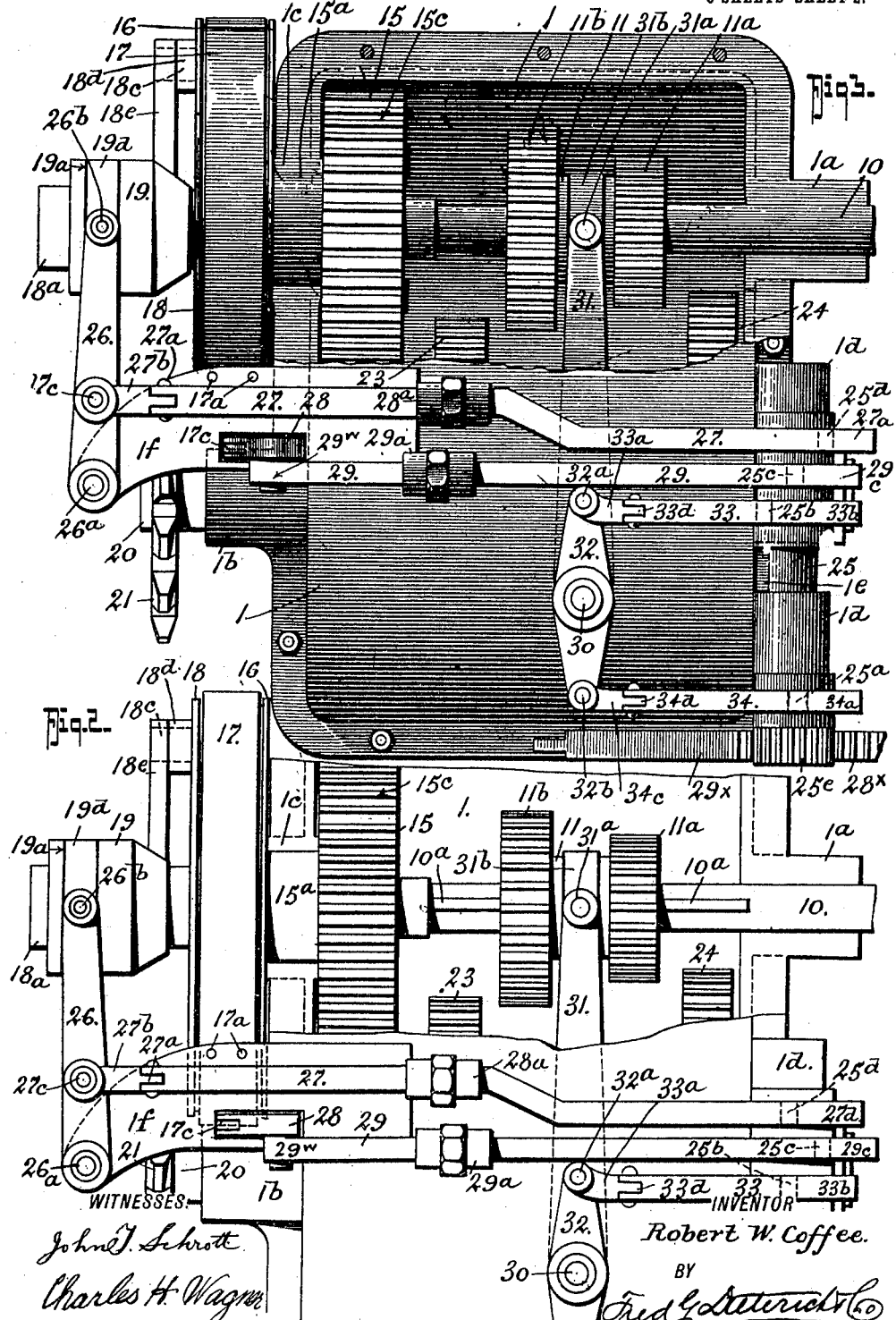

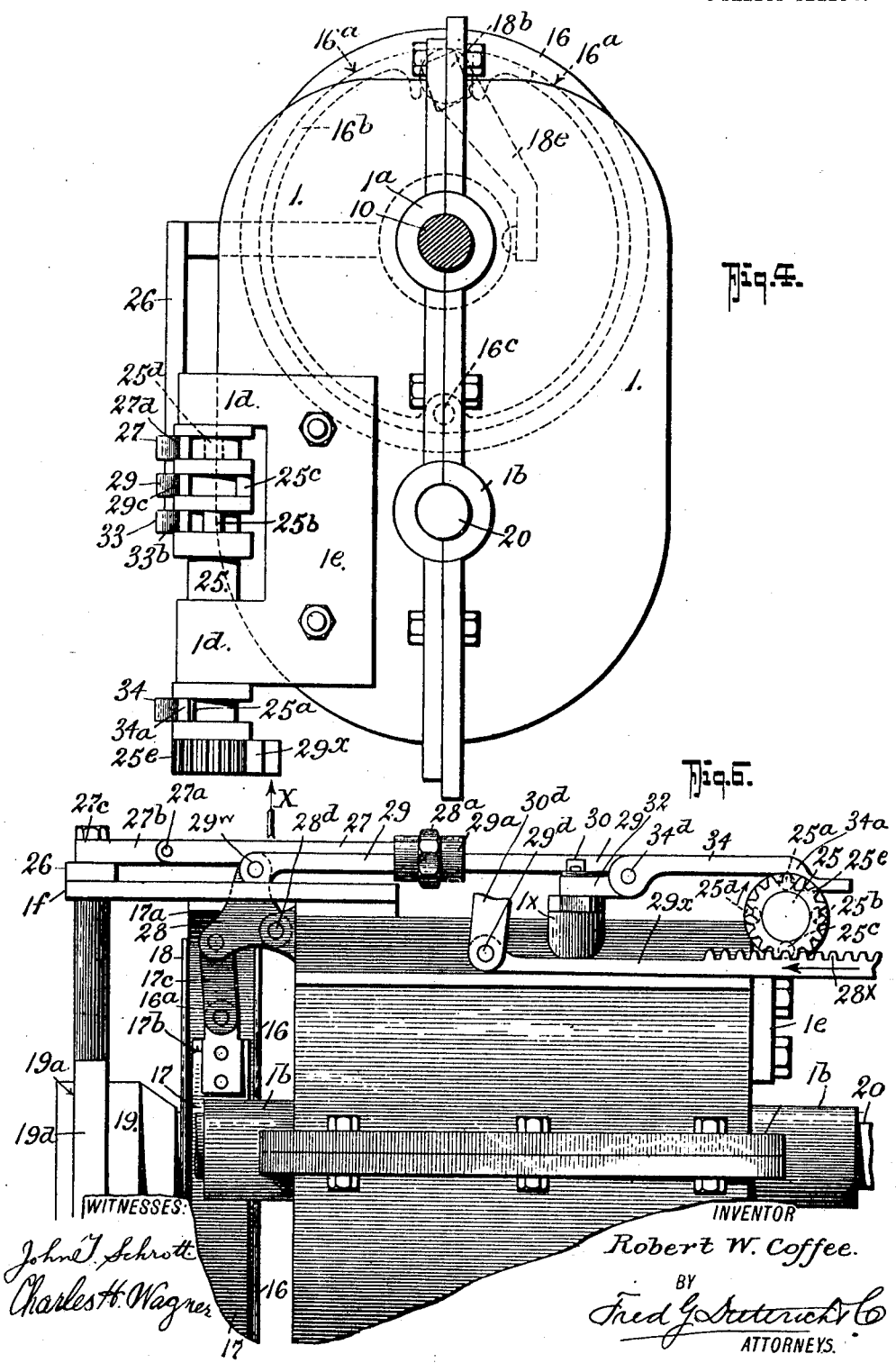

UNITED STATES PATENT OFFICE.

ROBERT W. COFFEE, OF RICHMOND, VIRGINIA, ASSIGNOR TO LEWIS M. KEIZER, OF BALTIMORE, MARYLAND.

TRANSMISSION-GEAR MECHANISM.

970,467.      Specification of Letters Patent.      Patented Sept. 20, 1910.

Application filed January 12, 1909. Serial No. 471,877.

*To all whom it may concern:*

Be it known that I, ROBERT W. COFFEE, residing at Richmond, in the county of Henrico and State of Virginia, have invented certain new and useful Improvements in Transmission-Gear Mechanism, of which the following is a specification.

My invention relates to certain new and useful improvements in transmission gear mechanisms, and particularly seeks to provide a transmission gear mechanism wherein a driven shaft is actuated from a drive shaft and connections between the drive and driven shafts, whereby the driven shaft may be turned in a direction opposite to the direction of movement of the drive shaft at a slow rate of speed, at an intermediate rate of speed, or at the same rate of speed as the drive shaft, and wherein means are provided for turning the driven shaft in the same direction as the drive shaft but at a slow speed.

My invention also has for its object to provide a single lever actuated mechanism for shifting the gear mechanisms that effect the operative connections between the drive and driven shafts.

My invention also includes those novel details of construction, combination and arrangement of parts, all of which will be first fully described, and then be specifically pointed out in the appended claims, reference being had to the accompanying drawings, in which:—

Figure 1, is a sectional view and part elevation illustrating my invention, the parts being in the position they assume when the driven shaft is rotating reversely to the drive shaft at a slow rate of speed. Fig. 2, is an elevation, parts being broken away, showing the position of the parts when a slow movement is imparted to the driven shaft to cause it to turn slowly in the same direction as the drive shaft. Fig. 3, is an elevation, parts being broken away, showing the position of the parts when the drive shaft is turning the driven shaft in a direction opposite to the direction of rotation of the drive shaft and at the same speed of rotation as that of the drive shaft. Fig. 4, is a side elevation of my invention showing the general arrangement of the controlling members for shifting the clutch and drum band devices and the shiftable gears on the power shaft and the rotary cam shaft for actuating said members. Fig. 5, is a vertical transverse section of the machine on the line 5—5 of Fig. 1. Fig. 6, is a detail face view of my invention looking in the direction of arrow X on Fig. 4.

In the practical application of my invention, when the same is used for an automobile transmission mechanism, the driven shaft rotates in a direction opposite to the direction of rotation of the drive shaft, so that when the slow, intermediate and fast speeds of the driven shaft are attained they will effect a forward movement of the vehicle and when the driven shaft rotates in the same direction as the drive shaft and at the slowest speed, the vehicle will be driven in a reverse direction.

In the drawings in which like letters and numerals of reference indicate like parts in all of the figures 1 represents the housing which is provided with bearings 1$^a$ for the drive shaft 10, that may be connected in any approved manner with the prime mover, (not shown). The casing 1 is also provided with bearings 1$^b$ for the driven shaft 20, which carries the sprocket 21, from which the power is taken. The driven shaft 20 carries a series of gears 22, 23 and 24, keyed to turn with the shaft 20.

11 designates a shiftable gear member that is slidably mounted on the drive shaft 10, but is keyed to turn with the drive shaft 10, by a key 10$^a$, (see Fig. 2). The shifting gear member 11 is provided with a pinion 11$^a$ to mesh with the gear 24 on the driven shaft 20 at times. The means for shifting the shiftable gear member 11 will be described later.

Secured to the shaft 10 to turn therewith is a sun gear 12 that meshes with orbital gears 13 on stub shafts 13$^a$ that are secured to a disk 14, which has a hub 14$^a$ that is apertured to permit passage of the shaft 10 and projects through the hub 15$^a$ of a rim gear 15 that has an internal gear face 15$^b$ to mesh with the orbital gears 13, and external gear face 15$^c$ to mesh with the gear 22 on the driven shaft, the hub 15$^a$ turning in a bearing 1$^c$ of the casing.

16 designates a drum, keyed or otherwise secured, to the hub 14$^a$ of the disk 14 to turn therewith, the drum 16 having a brake band receiving surface 16$^a$ around which the brake band 17 passes.

18 represents a clutch disk that is keyed to turn with the shaft 10, and has a hub 18ᵃ on which the shifting clutch member 19 is mounted, the clutch member 19 having a groove 19ᵃ for a purpose presently to appear.

Within the drum 16 is an expanding ring 16ᵇ that is secured at 16ᶜ to the drum and coöperates with an expander 18ᵇ that has a shaft portion 18ᶜ that projects through a bearing 18ᵈ and carries a lever 18ᵉ that is adapted to be engaged by the shifting clutch member 19 to expand the clutch ring 16ᵇ and lock the clutch disk 18 and the drum 16 to turn together with the drive shaft at times.

25 designates a rotatable operating shaft which is provided with pins 25ᵃ, 25ᵇ, 25ᶜ and 25ᵈ arranged ninety degrees apart with respect to the axis of rotation of the shaft, each of which pins 25ᵃ, 25ᵇ, 25ᶜ and 25ᵈ turn with the shaft in separate and distinct circles, see Figs. 3 and 4. The shaft 25 is mounted in bearings 1ᵈ in a bracket 1ᵉ secured to the casing 1 and coöperates with the various shifting members hereinafter referred to. On the bracket 1ᶠ projected from the casing 1 is a lever 26 that is pivoted at 26ᵃ to the bracket 1ᶠ and at 26ᵇ to the band 19ᵈ of the shifting clutch member 19 whereby as the lever 26 is actuated, the clutch member 19 will be shifted in one direction or another.

27 designates an arm which is pivoted at 27ᵃ to an arm 27ᵇ that is in turn pivoted at 27ᶜ to the lever 26, the arm 27 being made in two sections connected by a take-up union 28ᵃ, as shown, so that the arm 27 may be shortened or lengthened for purpose of adjustment. At the forward end the arm 27 is provided with a hook portion 27ᵈ that coöperates with the pin or crank member 25ᵈ on the shaft 25.

The brake band 17 which coöperates with the drum 16 is secured at one end at 17ᵃ to the bracket 1ᶠ and has its other end 17ᵇ secured to a bell crank lever 28 through the medium of a link 17ᶜ, the bell crank lever 28 being fulcrumed at 28ᵈ to a bracket on the casing 1 and being pivotally connected to an arm 29, the arm 29 being of similar construction as the arm 27 and having a take-up coupling 29ᵃ for the two sections of the arm 29 for a similar purpose to the coupling 28. At its free end the arm 29 has a hook 29ᶜ that coöperates with the pin or crank 25ᶜ on the shaft 25.

30 designates a rock shaft mounted in bearings 1ˣ on the casing 1, and carrying within the casing 1 an arm 31, which is pivoted at 31ᵃ to the band 31ᵇ of the shiftable gear member 11 whereby when the shaft 30 is rocked, the arm 31 will shift the member 11 from one position to another.

Outside of the casing the rock shaft 30 is provided with a double lever 32 to one end of which at 32ᵃ, a short arm 33ᵃ is pivoted, while at the other end of the lever 32, as at 32ᵇ, a short arm 34ᶜ is likewise pivoted, the short arms 33ᵃ and 34ᶜ being respectively pivoted at 33ᵈ and 34ᵈ to arms 33 and 34 respectively, the arm 33 at its free end having a hook portion 33ᵇ to coöperate with the pin or crank member 25ᵇ on the shaft 25, while the arm 34 at its free end has a hook member 34ᵃ to coöperate with the pin or crank member 25ᵃ of the rock shaft 25.

The rock shaft 25 is provided with a pinion 25ᵉ to coöperate with a rack 28ˣ on a reciprocating arm 29ˣ that is pivoted at 29ᵈ to an actuating lever 30ᵈ, through the medium of which the arm 29ˣ may be reciprocated to rotate the shaft 25 in one direction or the other.

In practice the rack portion 28ˣ is made sufficiently long to enable the required number of turns to be applied to the shaft 25 to effect the operation of the device as hereinafter explained, the rod 29ˣ being shown broken away in the drawings for convenience of illustration.

Operation: Assume the parts to be positioned as shown in Fig. 1, with the engine shaft imparting motion to the driven shaft in a direction opposite to the direction of rotation of the drive shaft and at a slow speed. When the parts are positioned as shown in Fig. 1 to drive the driven shaft at a slow speed the band 17 is off and the clutch ring 16 is loose. Now assume it is desired to impart motion to the driven shaft at an intermediate speed, in order to do this, it is necessary to bring the gears 11ᵇ and 23 into mesh. The operator moves the handle 30ᵈ to reciprocate the rod 29ˣ in one direction or the other as may be necessary, until the pin 25ᵃ engages the hook 34ᵃ. A continued movement of the rod 29ˣ in the direction of the arrow in Fig. 6, will then cause the lever 31 to be moved through the medium of the rock shaft 30 and lever 32 until the gear 11ᵇ is brought into mesh with the gear 23. The driven shaft will be rotated in a direction opposite to the direction of rotation of the drive shaft and at an intermediate speed. Now assume it is desired to impart to the driven shaft a movement in a direction opposite to that of the driven shaft and at the same speed of the drive shaft, the operator then moves the handle 30ᵈ to move the rod 29ˣ in a direction opposite to the arrow in Fig. 6, until the pin 25ᵇ comes into engagement with the hook 33ᵇ. He then moves the lever to move the rod 29ˣ in the direction of the arrow in Fig. 6, a sufficient distance to move the gears 11ᵇ and 11ᵃ in the position shown in Fig. 3, after which he moves the rod 29ˣ again in a direction opposite to the arrow in Fig. 6, until the pin 25ᵈ engages the hook 27ᵈ. The operator then moves the lever 30ᵈ to move the rod 29ˣ in the same direction as the arrow in Fig. 6, a sufficient amount to move the rod 27 to move the shiftable clutch 19 to apply the clutch band 17 to the inner periphery of the drum 16 and lock the drum 16 to the plate 18, thus locking the gear 15, plate 14 and drive shaft 10, together so that the gear 15 will rotate with the drive shaft and at the same speed, thus imparting an opposite rotation at the same speed to the driven shaft 20. Now assume that it is desired to impart a rotation to the driven shaft in the same direction as the drive shaft and at a slow movement, to reverse the movement of the vehicle the operator leaves the gears 11ᵇ—11ᵃ in the position shown in Figs. 2 and 3, and releases the movable clutch member 19, by releasing the engagement of the pin 25ᵈ with the hook 27ᵈ by moving the bar or rod 29ˣ in a direction opposite to that of the arrow in Fig. 6, continuing such movement a sufficient time to bring the pin 25ᶜ into engagement with the hook 29ᶜ and as soon as this engagement is effected the operator moves the rod 29ˣ in the direction of the arrow in Fig. 6, a sufficient distance to move the rod 29 to apply the brake band 17 and hold the drum 16 stationary, thus holding the plate 14 and the orbit gears 13 stationary, the plate 14 which carries the orbital gears being stationary. The rotation of the drive shaft 10 will be imparted to the gear 15 through the orbital gears to turn it in a direction opposite to the direction of rotation so as to impart motion to the driven shaft at a slow rate of speed and in the same direction as the motion of the drive shaft.

From the foregoing description taken in connection with the accompanying drawings it is thought the complete construction, operation and many advantages of my invention will be readily understood by those skilled in the art to which the invention appertains.

It should be mentioned that the provision of the pivots 27ᵃ, 33ᵈ, 34ᵈ and the pivot 29ʷ, as the shaft 25 is rotated counterclockwise to bring the respective pins into engagement with the respective hooks, the arms 27, 29, 33 and 34 will rise to permit the pins to come under and into engagement with the hooks 27ᵈ, 29ᶜ, 33ᵇ and 34ᵃ respectively.

It is to be understood that the pins 25ᵃ, 25ᵇ, 25ᶜ and 25ᵈ are spaced ninety degrees apart around the axis of the shaft 25 and turn in different distinct planes so that only one pin will be in engagement with one hook at a time.

It should be understood that the shaft 25 is turnable in either direction and so far as the respective members 27, 29, 33 and 34 are concerned the shaft 25 may be turned any number of revolutions in either direction. When the shaft 25 is turned clockwise, as found in Fig. 6, the respective members 25ᵈ, 25ᶜ, 25ᵇ, and 25ᵃ will come into engagement with the respective members 27, 29, 33 and 34 at intervals and after moving the respective members 27, 29, 33 and 34 from left to right in Fig. 6, the required distance, the members 25ᵈ and 25ᵉ etc. will leave the members 27, 29, etc., and permit the shaft 25 to continue its clockwise rotation. After the rack 28ˣ has been moved to the limit of its movement to the left in Fig. 6, it may be carried back to the limit of its movement in the direction opposite the arrow in Fig. 6, as the shaft 25 will readily turn in a counterclockwise direction without moving the members 27, 29, 33 and 34.

What I claim is:—

1. Transmission gearing comprising a drive shaft, a driven shaft and means actuated from the drive shaft for imparting a direct fast movement to the driven shaft, and an indirect slow movement to the driven shaft, mechanism for effecting the adjustments of said means, said mechanism including a single controlling lever.

2. Transmission gearing comprising a drive shaft, and a driven shaft, means for imparting slow, intermediate and fast movement to the driven shaft in a direction opposite to that of rotation of the drive shaft, means forming a coöperative part of one of said last named means for imparting movement to the driven shaft at a slow speed in the same direction as the drive shaft, and mechanism for effecting the adjustments of all of said means, said mechanism including a single controlling lever.

3. Transmission gearing comprising a drive shaft and a driven shaft, direct gear connections between the drive and driven shafts for effecting slow and intermediate movements to the driven shaft in a direction opposite to the movement of the drive shaft, planetary gear connections between the drive and driven shafts for effecting a slow movement of the driven shaft in the same direction as the drive shaft, means for shifting said direct gear connections to bring one or the other into operative relation, and other means for effecting the operative relation of the planetary gear mechanism to impart slow movement to the driven shaft in the same direction as that of the drive shaft, other means coöperating with the planetary gear means for causing a direct connection to be made between the drive and driven shafts through said planetary gear mechanism to effect a fast movement of the driven shaft in a direction opposite to the drive shaft, and a single means for controlling said mechanism.

4. Transmission gearing comprising the drive shaft and the driven shaft, direct gear connections between the drive and driven shafts for effecting slow and intermediate movements to the driven shaft in a direction opposite to the movement of the drive shaft, planetary gear connections between the drive and driven shafts for effecting a slow movement of the driven shaft in the same direction as the drive shaft, means for shifting said direct gear connections to bring one or the other into operative relation and other means for effecting the operative relation of the planetary gear mechanism to impart the slow movement to the driven shaft in the same direction as that of the drive shaft and other means coöperating with the planetary gear means for causing a direct connection to be made between the drive and driven shafts through said planetary gear mechanism to effect a fast movement of the driven shaft in a direction opposite the drive shaft, and a single means for controlling said mechanisms, said single means including a single actuating lever.

5. Transmission gearing, comprising a drive shaft, a driven shaft, gearing between said shafts for effecting several drives of the driven shaft, mechanism for shifting said gearing for any of such drives, and a single handle or lever having a connection with the shifting mechanism, such that one movement of the handle sets the shifting mechanism for the drive desired, and a movement of the handle in the reverse direction operates said mechanism to shift the gears.

6. Transmission gearing, comprising a drive shaft, a driven shaft, gearing between said shafts for effecting several drives of the driven shaft, mechanism for shifting said gearing for any of such drives, and a single handle or lever having a connection with the shifting mechanism such that by one of a variety of movements of the handle in one direction, the shifting mechanism is set for the drive desired, and by a movement of the handle in the other direction, the shifting mechanism is operated to shift the gears.

7. Transmission gearing, comprising a drive shaft, a driven shaft, gearing between said shafts for effecting several drives of the driven shaft, mechanism for shifting said gearing for any of such drives, and a single lever or handle having a connection with the shifting mechanism such that by one and the same movement of the handle, the shifting mechanism is operated to shift the gears for any desired drive.

8. Transmission gearing, comprising a drive shaft, a driven shaft, gearing between said shafts for effecting several drives of the driven shaft, means for shifting said gearing according to the drive desired, a movable member having means for engaging each of said shifting means separately, and handle connected with said movable member, said handle operating to move the engaging means of the movable member into engagement with the proper corresponding gear shifting means, and then operating by a further movement of the movable member to actuate such selected gear shifting means.

9. Transmission gearing, comprising a drive shaft, a driven shaft, gearing between said shafts for effecting several drives of the driven shaft, several means for shifting said gearing according to the drive desired, a rotary shaft having lugs for engaging each of said shifting means separately, and a handle connected with said rotary shaft, said handle operating to move one of the lugs of the rotary shaft into engagement with the proper corresponding gear shifting means, and then operating by further movement of the rotary shaft to actuate such selected gear shifting means.

10. Transmission gearing, comprising a drive shaft, a driven shaft, gearing between said shafts for effecting a forward and a reverse drive of the driven shaft, mechanism for shifting said gearing for either of such drives, and a single lever or handle having a connection with the shifting mechanism such that by selected movements of the handle, the shifting mechanism is operated to shift the gear for either the forward or the reverse drive.

11. Transmission gearing comprising a drive shaft and a driven shaft, planetary gear members in connection with said shafts designed to impart to the driven shaft a movement from the drive shaft in the same direction as that of the drive shaft, and means for locking said gear mechanism to the drive shaft to impart motion to the driven shaft in an opposite direction to that of the drive shaft.

12. Transmission gearing comprising a drive shaft and a driven shaft, planetary gear mechanism in connection with said shafts designed to impart to the driven shaft a movement from the drive shaft in the same direction as that of the drive shaft, means for locking said gear mechanism to the drive shaft to impart motion to the driven shaft in an opposite direction to that of the drive shaft and at a greater speed than the first mentioned movement.

13. Transmission gearing comprising a drive shaft, a driven shaft, a gear carried by the driven shaft, a gear through which the drive shaft projects, said gear having an internal rim gear portion and an external gear portion to mesh with the driven shaft gear, a pinion on the drive shaft, sun gears connecting the pinion with the internal rim portion of said drive shaft gear, combined with means for holding the sun gears from rotation with the drive shaft to impart an indirect drive to the driven shaft, and another means for locking the sun gears, the internal rim gear and the pinion together to rotate with the drive shaft to impart direct motion to the driven shaft.

14. Transmission gearing comprising a drive shaft, a driven shaft, a gear carried by the driven shaft, a gear through which the drive shaft projects, said gear having an internal rim gear portion and an external gear portion to mesh with the driven shaft gear, a pinion on the drive shaft, sun gears connecting the pinion with the internal rim portion of said drive shaft gear, combined with means for holding the sun gears from rotation with the drive shaft to impart an indirect drive to the driven shaft, and another means for locking the sun gears, the internal rim gear and the pinion to rotate with the drive shaft to impart direct motion to the driven shaft, and at a greater speed than the first mentioned movement.

15. Transmission gearing comprising a drive shaft, a driven shaft, a gear carried by the driven shaft, a gear through which the drive shaft projects, said gear having an internal rim gear portion and an external gear portion to mesh with the driven shaft gear, a pinion on the drive shaft, sun gears connecting the pinion with the internal rim portion of said drive shaft gear, combined with means for holding the sun gears from rotation around the drive shaft to impart an indirect drive to the driven shaft, and another means for locking the sun gear, the internal rim gear and the pinion together to rotate with the drive shaft to impart direct motion to the driven shaft and a shifting mechanism to operate said holding and locking means, and a single lever for selectively operating said shifting mechanism.

16. Transmission gearing comprising a drive shaft, a driven shaft, a gear carried by the driven shaft, a gear through which the drive shaft projects, said gear having an internal rim gear portion and an external gear portion to mesh with the driven shaft gear, a pinion on the drive shaft, sun gears connecting the pinion with the internal rim portion of said drive shaft gear, combined with means for holding the sun gears from rotation around the drive shaft to impart an indirect drive to the driven shaft, and another means for locking the sun gears, the internal rim gear and the pinion to rotate with the drive shaft to impart direct motion to the driven shaft, and at a greater speed than the first mentioned movement, and a shifting mechanism to operate said holding means, and a single lever for selectively operating said shifting mechanism.

17. Transmission gearing comprising a drive shaft, a driven shaft, gear connections between said shafts designed to impart to the driven shaft direct motion from the drive shaft when under one adjustment and indirect movement to the driven shaft when under another adjustment, and a single lever operating means for selectively effecting said adjustments.

18. Transmission gearing comprising a drive shaft, a driven shaft, gear connections between the drive and driven shafts, means coöperating with said gear connections for forming a part of said gear connections when under one adjustment, then imparting an indirect movement to the driven shaft from the drive shaft, means for effecting such adjustment, and another means for locking said gear connections to effect a direct drive between the drive and driven shafts, and a single lever actuated means for controlling said locking means and said means for effecting the adjustment of said indirect driving means.

19. Transmission gearing comprising a drive shaft, a driven shaft, gear connections between said shafts to impart a direct drive from the drive to the driven shaft when under one adjustment and for imparting an indirect drive to the driven shaft when under another adjustment, means for effecting the several adjustments of said gear connections, said means including a brake mechanism, means for actuating said brake mechanism to effect one adjustment, another means for locking that portion of the gear mechanism carried by the drive shaft to the drive shaft to turn therewith, mechanism for selectively controlling said locking mechanism and said brake mechanism to effect the several adjustments of the gears.

20. Transmission gearing comprising a drive shaft, a driven shaft, gear connections between said shafts to impart a direct drive from the drive to the driven shaft when under one adjustment and for imparting an indirect drive to the driven shaft when under another adjustment, means for effecting the several adjustments of said gear connections, said means including a brake mechanism, means for actuating said brake mechanism to effect one adjustment, another means for locking that portion of the gear mechanism carried by the drive shaft to the drive shaft to turn therewith, mechanism for selectively controlling said locking mechanism and said brake mechanism to effect the several adjustments of the gears, said mechanism including a rotatable selecting shaft, connections between said selecting shaft and said locking mechanism, connections between said selecting shaft and said brake mechanism, and means for turning said selecting shaft.

21. Transmission gearing comprising a drive shaft, a driven shaft, gear connections between said shafts to impart a direct drive from the drive to the driven shaft when under one adjustment and for imparting an indirect drive to the driven shaft when under another adjustment, means for effecting the several adjustments of said gear connections, said means including a brake mechanism, means for actuating said brake mechanism to effect one adjustment, another means for locking that portion of the gear mechanism carried by the drive shaft to the drive shaft to turn therewith, mechanism for selectively controlling said locking mechanism and said brake mechanism to effect the several adjustments of the gears, said mechanism including a rotatable selecting shaft, connections between said selecting shaft and said locking mechanism, connections between said selecting shaft and said brake mechanism, means for turning said selecting shaft, said last named means comprising a single actuating lever and connections between said actuating lever and the selecting shaft.

22. Transmission gearing comprising a drive shaft and a driven shaft, a gear carried by the driven shaft, a gear loosely mounted on the drive shaft, a pinion on the drive shaft, orbital gears connecting said pinion with said loose gear, and means for holding said orbital gears stationary to impart movement to said loose gear in a direction opposite to the direction of rotation of the drive shaft.

23. Transmission gearing comprising a drive shaft and a driven shaft, a gear carried by the driven shaft, a gear loosely mounted on the drive shaft, a pinion on the drive shaft, orbital gears connecting said pinion with said loose gear, means for holding said orbital gears stationary to impart movement to said loose gear in a direction opposite to the direction of rotation of the drive shaft, and another means for locking said loose gear, said orbital gears and said pinion together to turn with the drive shaft.

24. Transmission gearing comprising a drive shaft and a driven shaft, a gear carried by the driven shaft, a gear loosely mounted on the drive shaft, a pinion on the drive shaft, orbital gears connecting said pinion with said loose gear, means for holding said orbital gears stationary to impart movement to said loose gear in a direction opposite to the direction of rotation of the drive shaft, and another means for locking said loose gear, said orbital gears and said pinion together to turn with the drive shaft, and means for controlling said locking means and said orbital gear holding means to effect the required adjustments of the mechanism.

25. Transmission gearing comprising a drive shaft and a driven shaft, a gear carried by the driven shaft, a gear loosely mounted on the drive shaft, a pinion on the drive shaft, orbital gears connecting said pinion with said loose gear, means for holding said orbital gears stationary to impart movement to said loose gear in a direction opposite to the direction of rotation of the drive shaft, another means for locking said loose gear, said orbital gears and said pinion together to turn with the drive shaft, means for controlling said locking means and said orbital gear holding means to effect the required adjustments of the mechanism, and a single lever actuated means for operating said controlling means.

26. Transmission gearing comprising a drive shaft and a driven shaft, gear connections between the drive and driven shafts, means for locking said gears to impart a direct drive to the driven shaft from the drive shaft at times, another means for holding certain of said other gears to throw the gears into train to impart an indirect drive to the driven shaft from the drive shaft, and a single lever operated selecting and actuating mechanism for controlling said locking and holding mechanism.

ROBERT W. COFFEE.

Witnesses:
J. A. HILLEARY, Jr.,
JOHN C. MURRILL.